United States Patent
Przonek et al.

(10) Patent No.: US 12,381,733 B1
(45) Date of Patent: Aug. 5, 2025

(54) SECURE BIOMETRIC DATA STORAGE AND RETRIEVAL SYSTEM

(71) Applicant: Verai Systems Inc., Middletown, DE (US)

(72) Inventors: Richard Przonek, Glen Head, NY (US); Lance D Reich, Albany, NY (US)

(73) Assignee: Verai Systems, LLC, Port Washington, NY (US)

( * ) Notice: Subject to any disclaimer, the term of this patent is extended or adjusted under 35 U.S.C. 154(b) by 324 days.

(21) Appl. No.: 18/130,319

(22) Filed: Apr. 3, 2023

(51) Int. Cl.
    *H04L 9/32*     (2006.01)
    *H04L 9/08*     (2006.01)

(52) U.S. Cl.
    CPC .......... *H04L 9/3231* (2013.01); *H04L 9/0819* (2013.01); *H04L 9/3213* (2013.01)

(58) Field of Classification Search
    CPC .... H04L 9/3231; H04L 9/0819; H04L 9/3213
    See application file for complete search history.

(56) References Cited

U.S. PATENT DOCUMENTS

| | | | | |
|---|---|---|---|---|
| 2004/0010697 A1* | 1/2004 | White | ..................... | G06F 21/31 713/186 |
| 2004/0250085 A1* | 12/2004 | Tattan | .................. | H04L 67/306 713/186 |
| 2013/0036309 A1* | 2/2013 | Kevenaar | .................. | H04L 9/00 713/186 |
| 2013/0262873 A1* | 10/2013 | Read | .................... | H04L 63/0861 713/186 |
| 2019/0278895 A1* | 9/2019 | Streit | ..................... | G06V 40/45 |
| 2019/0356491 A1* | 11/2019 | Herder, III | ............ | H04L 9/3242 |
| 2020/0036707 A1* | 1/2020 | Callahan | ................. | H04L 67/53 |
| 2020/0412541 A1* | 12/2020 | Yang | ................... | H04L 63/0861 |
| 2022/0294631 A1* | 9/2022 | Herder, III | ................ | H04L 9/30 |
| 2023/0134651 A1* | 5/2023 | Agbamu | ............. | G06V 40/172 705/325 |

* cited by examiner

*Primary Examiner* — Techane Gergiso
(74) *Attorney, Agent, or Firm* — Bamert Regan PLLC (57) ABSTRACT

A computer system and method for storage and retrieval of encrypted biometric data which includes a biometric data intake device that selectively intakes original biometric data from a user and communicates with a biometric data management system. The biometric data management system has a resident data storage or a remote storage in communication therewith for the selective storage and retrieval of the encrypted biometric data. The system and method allow a user to originally encrypt biometric data such that the user solely possesses one of the necessary keys for later decryption of the stored and encrypted biometric data. The system and method will then doubly encrypt and store the user's biometric data in such a secure manner that the data can be stored on a public blockchain architecture, if desired. Full decryption of the original user biometric data for identity verification can only be performed with access to the user key.

17 Claims, 7 Drawing Sheets

SECURE BIOMETRIC DATA STORAGE AND RETRIEVAL SYSTEM

BACKGROUND OF THE INVENTION

1. Field of the Invention

The present invention generally relates to secure data storage computer systems. More particularly, the present invention is for a system and method that allows the intake and encryption of biometric data from a user such that it is storable and retrievable in encrypted form and can only be reconstituted into usable biometric data with at least one key from that user.

2. Description of the Related Art

Biometric data is data created from unique characteristics of a specific individual, such as fingerprints, retinal scan, face-recognition and DNA structure. Biometric data is unique for every person and is therefore an excellent way to verify a person's identity.

For verification, a reference set of biometric data is stored such that a later-obtained set of biometric data can be compared against the reference set. For example, a reference fingerprint data set can be obtained in a secure manner and then identity can be verified by taking a new fingerprint data set and comparing it against the reference set to see how similar the new set and reference set are. Many electronic devices, such as smartphones and laptops contain fingerprint devices that perform this function and store the reference set locally at the device, and a user must swipe a finger to be given access to the device.

One problem arises when a larger referential biometric data set is to be stored in a database. There are many laws that regulate and restrict the storage and liability for storing biometric data. There is not an overarching law that protects user privacy and regulates collection and usage of biometric data by private or government organizations. In most many countries, laws specific to biometric data are yet to be implemented. Instead, the gathering, storage, and use of biometric data is regulated by existing privacy laws. In the United States, both federal and state laws can apply to the activity.

In the US, the main federal law used to regulate biometric data is Section 5 (a) of the Federal Trade Commission Act (FTC Act) (15 USC § 45). Federal enforcement of this law has mostly involved providing the users clear terms on what their collected biometric data will be used for. There continue to be bills proposed for privacy laws that allow more federal regulation of biometric data.

Specific states in the US, such as Washington state, Illinois and Texas have biometric data privacy laws that apply to biometric data collected and stored for those states' citizens. It is likely more states will pass application laws that will create a patchwork and a further complicated web of laws governing collection of biometric data within the US.

The European Union (EU) has legislated the General Data Protection Regulation (GDPR) (EU) 2016/679. That regulation defines biometric data as "personal data resulting from specific technical processing relating to the physical, physiological, or behavioral characteristics of a natural person, which allows or confirms the unique identification of that natural person, such as facial images or fingerprint data." While persons can consent to whatever use of biometric data they wish to, the GDPR limits the activities and increases liability for the storage of the biometric data.

Accordingly, entities that wish to store biometric data have attempted to store the data in a manner that does not implicate any national or organizational laws or regulations on the storage of biometric data. The primary method used to accomplish this goal is the hashing of biometric data prior to its storage. For example, ID.ME and APPLE initially intake biometric data and then hash the data with an encryption key, such as a 256-bit hex session key or other one-way mathematical operation. In such manner, the stored data is not pure biometric data but is mathematically encrypted such that direct access to the biometric data is not possible.

To access the stored hashed biometric data set, a biometric data intake device, e.g., a fingerprint scanner or face-print camera, intakes new biometric data from a user and then executes an identical hash function on that biometric data and then the hashed set is compared to the stored hashed set to determine identicality of the data sets and thus, verify the identity of the user based on the comparison.

A problem arises in both the storage of either usable biometric data or hashed biometric data in that the system which stored the biometric data has direct access to the data. Even the hashed biometric data can be unencrypted as the hash key is stored somewhere within the verification system, either at the intake device or some data storage accessible to the system. Consequently, the entity in control of the data storage can be compelled to produce usable biometric data to a third party, such as a court, law enforcement, or governmental entity.

Many people are very hesitant to provide biometric data to any entity-private or public-because of the highly sensitive nature of the data. This is unique data that cannot be faked so if someone improperly obtained the biometric data, they could perform significant identity fraud on an individual that is next to impossible to prevent. This reticence to obtain and store biometric data is even greater with respect to DNA.

DNA structure for a user can be used for both identification purposes and medical diagnostic purposes. The knowledge that the entity in control of a biometric data storage system can provide, or even be compelled to provide, usable DNA data to any third party prevents a person from storing their data. Furthermore, there have been thefts and hacking of stored biometric data, including DNA, from both private and public systems. Thus, the fears of the users to store accessible biometric data is reasonable.

SUMMARY OF THE INVENTION

As seen in the discussion above, there is a need to provide a system and method for intake and storage of biometric data that allows the storage of the data in a manner that does not violate or implicate privacy laws and regulations. Furthermore, it would be advantageous to store the biometric data in a manner that is not accessible to any other person or entity than the user. This would minimize the risk of data theft and coerced production of usable biometric data of the user.

In overview, the present invention is for a computer system and method for storage and retrieval of encrypted biometric data from a user that allows confidential storage of biometric data that is only accessible with the permission of the user. The system and method include a biometric data intake device that intakes original biometric data from a user and communicates with a biometric data management system for encryption, storage, and retrieval of the biometric data. The biometric data management system can have a resident data storage or a remote storage in communication therewith for the selective storage and retrieval of the encrypted biometric data.

The system and method allow a user to originally encrypt biometric data such that the user solely possesses one of the necessary encryption keys for full decryption of the stored and encrypted biometric data. The encrypted biometric data is then doubly encrypted and stored in such a secure manner that it can be stored on a public blockchain architecture if desired. Full decryption of the original user biometric data for identity verification can only be performed with access to the user's encryption key.

In one embodiment, the system includes a biometric data intake device that selectively intakes original biometric data from a user, with the device communicably connected to a network, such as the Internet, WAN, or other public or private network. A biometric data management system is also connected to the network and in selective communication with the biometric data intake device, with the biometric data management system in communication with at least one data storage for the selective storage and retrieval of encrypted biometric data. Upon a request from the biometric data intake device to intake a new user's data, the biometric data management system transmits a first encryption key to the biometric data intake device for original user biometric data intake.

The biometric data intake device then receives the first encryption key from the biometric data management system, obtains a user key from a user, and then creates a second encryption key from the first encryption key and user key, either through hashing or other mathematical operation. Once the second key is created, the device intakes original user biometric data from the user, encrypts the original user biometric data with the second encryption key to create a first encrypted user biometric data, and then transmits the first encrypted user biometric data to the biometric data management system across the network. In one embodiment, the device then stores the second encryption key at a device of the user and deletes the second encryption key (and user key and first encryption key) from the biometric data intake device.

Upon receipt of the first encrypted user biometric data, the biometric data management system generates a third encryption key, further encrypts the first encrypted user biometric data with the third encryption key to create a second encrypted user biometric data, and stores the second encrypted user biometric data at a data storage. The data storage can be either local, remote, or cloud-based storage, and can be public or private.

In an embodiment, the biometric data management system further creates a verification token and embeds the verification token with the first encrypted user biometric data prior to encrypting the encrypted user biometric data with the third encryption key, such that second encrypted user biometric data contains the verification token embedded therein. The system then stores the second encrypted user biometric data. In this embodiment, when the system receives a user request for the user biometric data, with the request including the second encryption key, the system retrieves the second encrypted user biometric data from the data storage, decrypts the second encrypted user biometric data with the third key such that the data becomes first unencrypted user biometric data and the verification token. The system then verifies the integrity of the verification token which indicates the first encrypted user biometric data was successfully stored and retrieved. A plurality of verification tokens can also be utilized within the stored data. The system then decrypts the first encrypted user biometric data with the second encryption key received from the user to become original user biometric data.

In an embodiment, the biometric data management system can transmit the original user biometric data to a third-party biometric comparison device across the network when a user needs to be identified with biometric data. The biometric data management system then retrieves new user biometric data from a point-of-sale device across the network, compares the new biometric user data against the unencrypted original user biometric data to determine a matching status, and then transmits the matching status to the point-of-sale device across the network.

The present system and method for intake and storage of biometric data therefore provide advantages by allowing the storage of biometric data in a manner that does not violate or implicate privacy laws and regulations because the data is not accessible without a key from the user. The system and method can therefore store biometric data in a manner that minimizes the risk of data theft and coerced production of usable biometric data of the user. Upon user permission (with the key), the stored encrypted biometric data can be retrieved and unencrypted into a usable biometric data reference set for user identity verification purposes.

DETAILED DESCRIPTION OF THE INVENTION

Figure 1:
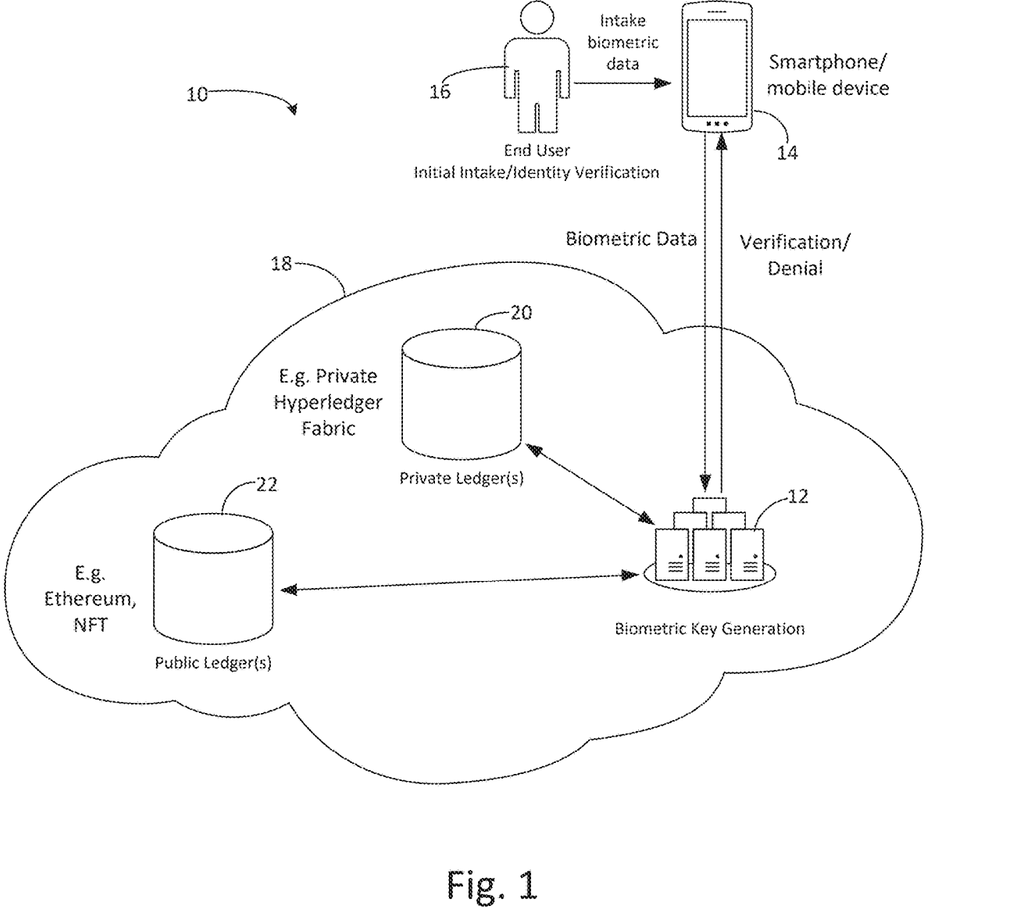
FIG. 1 is a representative diagram illustrating one embodiment of the biometric data management system in selective communication with a biometric data intake device, embodied here as a smartphone mobile device.

With reference to the figures in which like numeral represent like elements throughout, FIG. 1 is a representative diagram illustrating one embodiment of one architecture of a system 10 for biometric data management. Here, a biometric data management system 12 is embodied as virtual servers connected to a network 18, shown here as the Internet, and biometric data management system 12 is in selective communication with the biometric data intake device 14, which is embodied here as a smartphone/mobile device for an end user 16 who will store encrypted biometric data on the biometric data management system 12. As embodied here, the biometric data management system 12 is in further communication with at least one data storage for the selective storage and retrieval of encrypted biometric data. The data storage shown in this embodiment is a private Hyperledger fabric database 20, as well as a public ledger 22, such as ETHEREUM, NFT, or other public blockchain architecture.

In the embodiment of FIG. 1, the biometric data intake device, embodied here a smartphone/mobile device 14 is configured to selectively intake original biometric data from a user 16, such as the intake of a fingerprint or face-scan, and will selectively communicate across the network to encrypt and store that data in the biometric data management system 12 as is further described herein.

Figure 2:
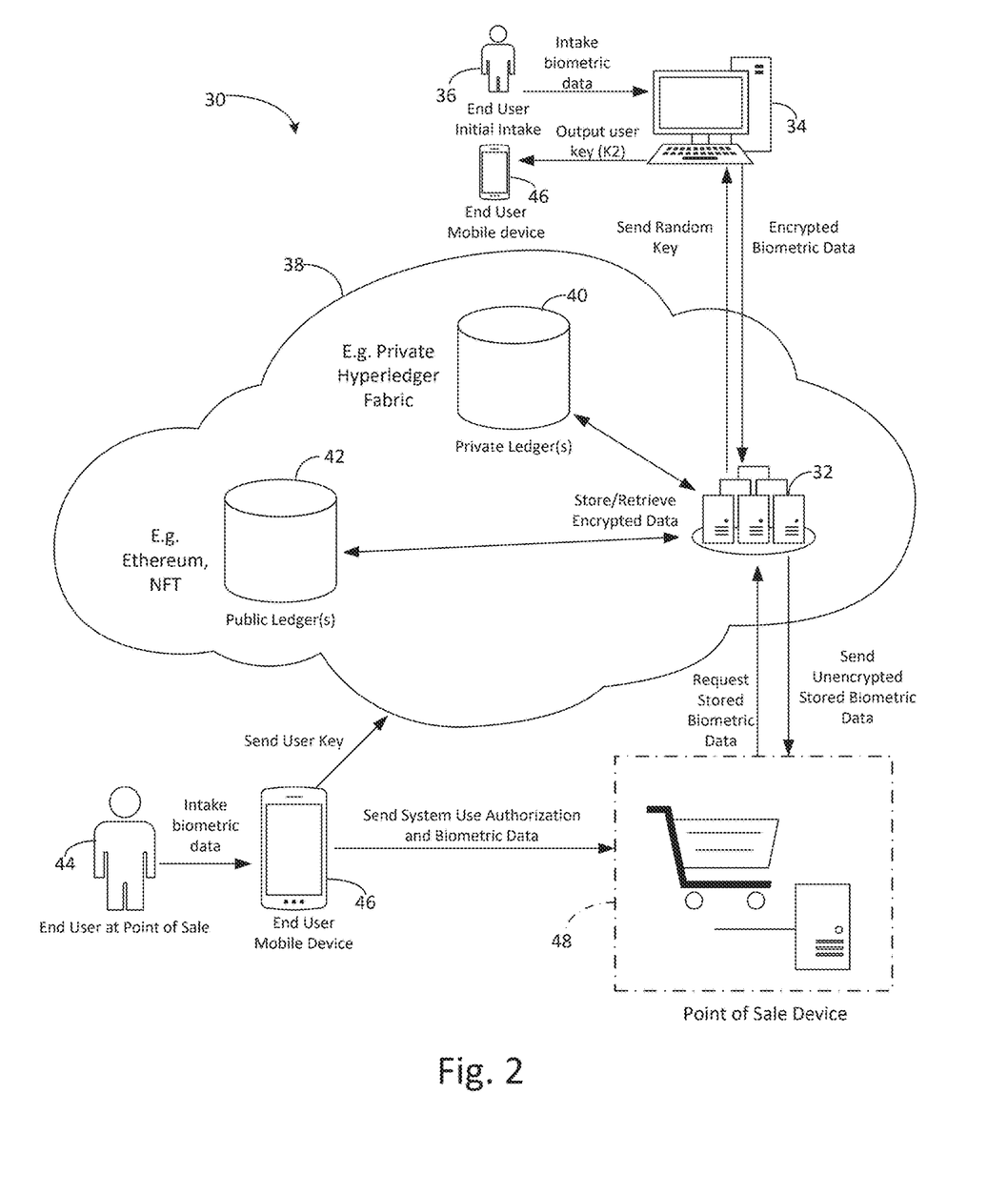
FIG. 2 is a representative diagram illustrating one embodiment of the biometric data management system with a dedicated biometric data intake device, a user device, and a point-of-sale device for user identity verification.

FIG. 2 is a representative diagram illustrating another embodiment of the system 30 for biometric data management that allows point-of-sale verification of user identity with biometric data. In this embodiment, a dedicated biometric data intake device 34, a user device 46 (e.g., an end user mobile device), and a point-of-sale device (also referred to as a point-of-sale verification device or point-of-verification device) are used for user identity verification. Here, one embodiment of the biometric data management system 32 is embodied with virtual servers connected to a network 38, shown here as the Internet, but can be any private or public wired or wireless data communication network. The biometric data management system 32 is in selective communication with several devices across the network 38.

There is a dedicated biometric data intake device 34 that will initially intake biometric data from an end user 36. The dedicated biometric data intake device 34 may include a computer, laptop, or other specialized equipment to intake biometric data such as fingerprints, retina scans, face-scans, and DNA. In this configuration, the end user 44 at a point-of-sale 48 who desires to use biometric data to prove user identity for a transaction will have a mobile device 46 with them, here embodied as a smartphone/mobile device 46, that will hold the user key necessary to authorize the decryption of the stored user biometric data as is further described herein.

As embodied in FIG. 2, the biometric data management system 32 is in further communication with at least one data storage for the selective storage and retrieval of encrypted biometric data. The data storage shown in this embodiment is a private Hyperledger fabric database 40, as well as a public ledger 42, such as ETHEREUM, NFT, or other public blockchain architecture. In this embodiment, the point-of-sale 48, and the computer device thereat, can make the ultimate biometric data comparison of the end user 44 with a stored and encrypted biometric data for that user 44, or the comparison for verification can be made at the biometric data management system 32 and the results of the comparison can be sent to the point-of-sale 48 to allow or deny the desired transaction.

Figure 3A:
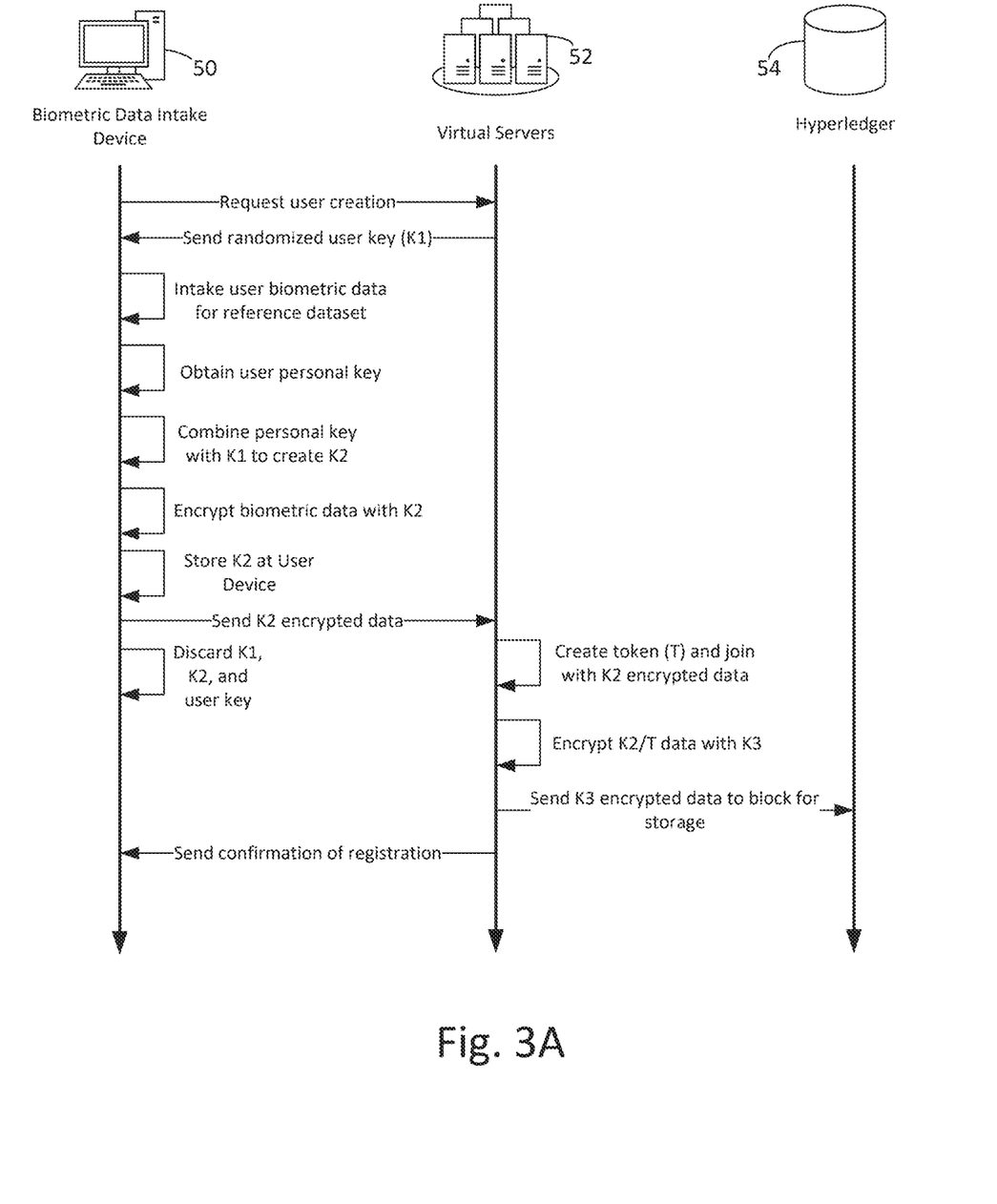
FIG. 3A is a data-flow diagram illustrating the data-flow and processes between the user biometric data intake device, virtual servers of the biometric data management system and a data storage embodied as a Hyperledger fabric.

FIG. 3A is a data-flow diagram illustrating the data-flow and processes between the user biometric data intake device 50, virtual servers of the biometric data management system 52 and a data storage 54, embodied as a Hyperledger fabric.

In this embodiment, upon a request from the biometric data intake device to intake a new user's data, the biometric data intake device 50 sends a request for biometric data intake for user creation to the virtual servers 52, which then transmits a first encryption key (K1) to the biometric data intake device 50 for original user biometric data intake. The Key K1, or any key described herein can be any standard session random or pseudorandom number of any size. In one embodiment, the key K1 is a 256-bit hexadecimal prime number generated at random.

The biometric data intake device 50 then receives the first encryption key (K1) from the virtual servers 52 and intakes user biometric data to constitute a biometric reference dataset, and then obtains a user key from a user. That user key can be any data provided by the user, such as a pin, answer to a question, a word, a key sent from a user device, such as mobile device, or biometric data itself. The intake of the biometric data can be a single set of a single type of data, such as one or more fingerprints, or can be a set of biometric data, such as fingerprints, a face-scan, retinal image, and DNA. The biometric data can be stored in an open-source or other formats, such as in NIST Biometric Image Software (NBIS), such that it is usable on common biometric data platforms. This allows selective use of any set of biometric data of the user for identity verification.

The biometric data intake device 50 then creates a second encryption key (K2) from the first encryption key and user key, either through hashing or other mathematical operation between the keys. In doing so, this allows the creation of the second key (K2) to be unknown to the virtual servers 52, especially as the local copies of the user key, first key (K1) and second key (K2) are deleted from the user biometric intake device 50 as is further described herein. The biometric data intake device 50 intakes original user biometric data from the user, which can be done simultaneously or prior to the creation of the second key (K2). The biometric data intake device 50 then encrypts the original user biometric data with the second encryption key (K2) to create a first encrypted user biometric data (K2 encrypted data). If embodied with solely the user mobile device, such as smartphone/mobile device 14 in FIG. 1, as the biometric data intake device, the intake process can occur solely at the mobile device 14 as described herein.

The encryption can be multiplication, prime-key pair multiplication, elliptical curve cryptography, or any other satisfactory one-way mathematical encryption. The encryption with K2 means that the user's biometric data will not be accessible to the biometric data management system without K2 being provided from the user. This allows the system to be secure against insider theft or attack to access unencrypted user biometric data that is stored on or through the system.

The biometric data intake device 50 then transmits the first encrypted user biometric data to the virtual server 52 of the biometric data management system (32 in FIG. 2) across the network (38 in FIG. 2). In one embodiment, the device then stores the second encryption key (K2) at a device (46 in FIG. 2) of the user (44 in FIG. 2) and deletes the second encryption key (and user key and first encryption key (K1) from the biometric data intake device 50. If embodied with solely the user mobile device at the biometric data intake device, such as smartphone/mobile device 14 in FIG. 1, the mobile device 14 will store the second encryption key (K2) and delete the first encryption key (K1) and user key. The mobile device 14 can also be embodied to be transferred to other devices and locations in a secure manner at the direction of the end user 16.

Upon receipt of the first encrypted user biometric data, the virtual servers 52 of biometric data management system generates a verification token (T) for the encryption and decryption of the first encrypted data. In some examples, the verification token (T) is an encryption key. The verification token (T) can be any number of any size, but should be sufficient to supply the belief that an error of the verification token will indicate a compromise/error of first encrypted data. One or more verification tokens (T) can also be used and placed with a selected block of first encrypted data (K2 encrypted data) before it is encrypted with a third key (K3). The virtual servers 52 then creates a further key (K3) that it uses to further encrypt the first encrypted user biometric data with the verification token to create a second encrypted user biometric data (K3 encrypted data). The virtual servers 52 then stores the second encrypted user biometric data at a data storage 54, shown here as a Hyperledger fabric. The virtual servers 52 then sends a confirmation of storage (e.g., registration) of the biometric data to the biometric data intake device 50.

Figure 3B:
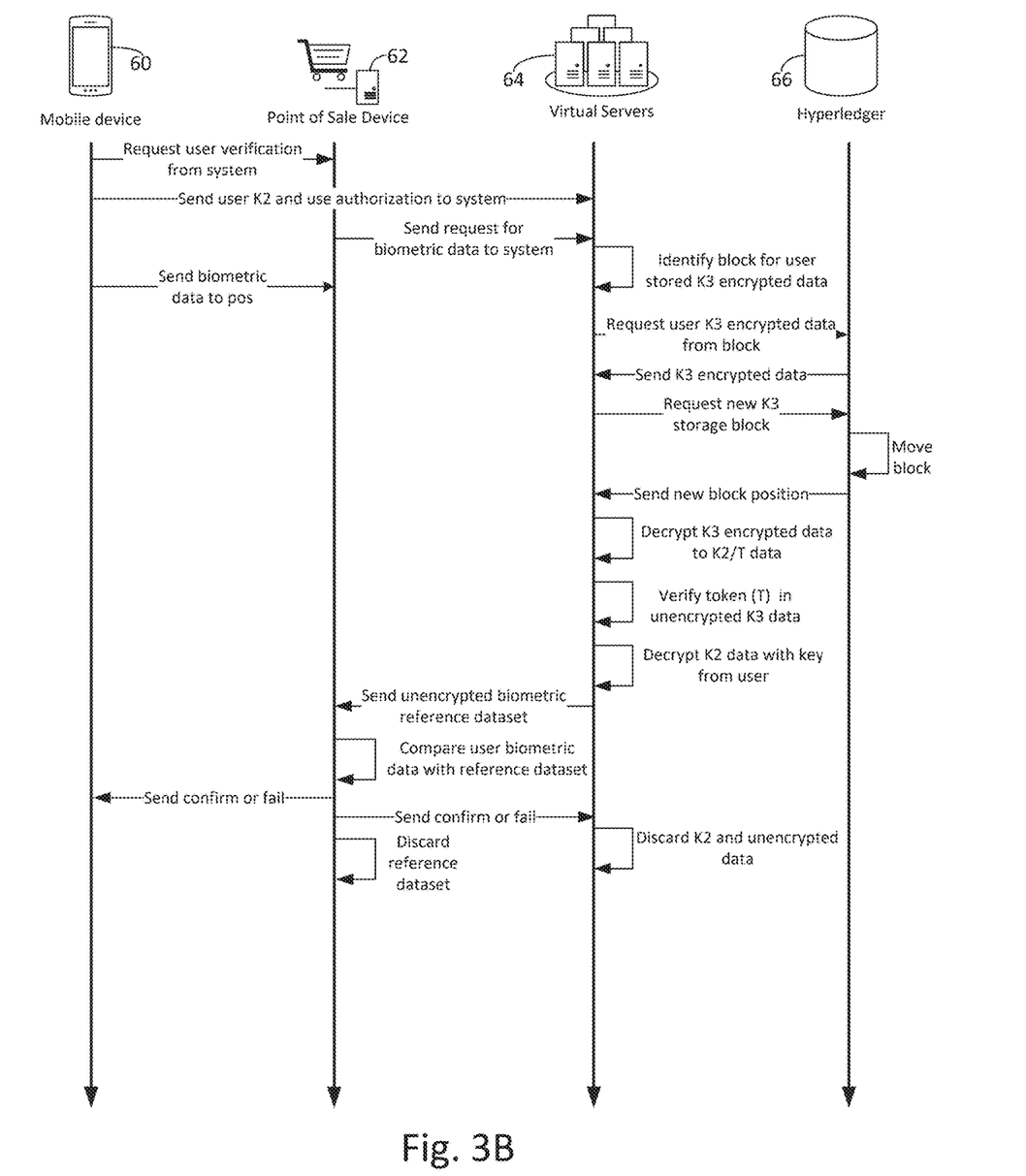
FIG. 3B is a data-flow diagram illustrating the data-flow and processes between a user's mobile device, a point-of-sale device, the virtual servers of the biometric data management system, and the data storage embodied as a Hyperledger fabric.

FIG. 3B is a data-flow diagram illustrating one embodiment of the data-flow and processes for verification of a user's identity with the unencrypted biometric data set used as a reference. In this embodiment, which can utilize the system 30 as architected in FIG. 2, the process utilizes a user's mobile device 60, a point-of-sale device 62, the virtual servers 64 of the biometric data management system, and the data storage 66 embodied as a Hyperledger fabric. The mobile device 60 of the user sends a user verification request for the user biometric data to both the point-of-sale verification system 62 and the virtual servers 64 of the biometric data management system (32 in FIG. 2), with the request for authorization of the system 30 (FIG. 2) including the second encryption key (K2). The point-of-sale device 62 likewise sends a request for user verification to the virtual servers 64 such that the virtual servers 64 can correspond the mobile device 60 request to the point-of-sale device 62 request.

In this embodiment, biometric data of the user is taken in at the mobile device 60 and sent to the point-of-sale device 62 for later comparison. The biometric data could likewise be directly taken at the point-of-sale device 62 itself if it has the necessary equipment.

Once the user authorization request is received, the virtual servers 64 then identify the specific storage block(s) for the doubly-encrypted user stored biometric data (K3 encrypted data) at the Hyperledger 66, then request that block from the Hyperledger 66 to retrieve the second encrypted user biometric data from the Hyperledger 66 data storage. The Hyperledger 66 then sends the block(s) of second encrypted user biometric data (K3 encrypted data). In this embodiment, the virtual servers 64 then request a new storage block(2) for the second encrypted biometric data and the Hyperledger 66 accordingly moves the K3 encrypted data to the new storage block(s) and sends the new block position(s) to the virtual servers 64. In such embodiment, the storage blocks can be a on public Hyperledger and accessible, as a third-party will neither know which specific block a user's data is held in or have the encryption keys decrypt the block.

The virtual servers 64 then unencrypt (i.e., decrypt) the second encrypted user biometrics data with the third key (K3) such that the data becomes first unencrypted user biometric data and the verification token(s) (T). The virtual servers 64 can then verify the integrity of the verification token(s) (T). Then if embodied as receiving the second encryption key (K2) from the user device as shown, the virtual servers 64 unencrypts the first encrypted user biometric data with the second encryption key (K2) to become original user biometric data. The virtual servers 64 then send the unencrypted biometric data as a reference set to the point-of-sale device 62. The point-of-sale device 62 can then compare the new biometric data from the user with the reference biometric dataset to verify the identity of the user. The point-of-sale device 62 can then send a confirm or fail to the mobile device 60 to inform the user of the transaction confirm or fail, and can also send the confirm or fail to the virtual servers 64 such that the system 30 is aware of the fate of the transaction.

In this embodiment, the point-of-sale device 62 also discards the reference dataset, as well as the user's new biometric data. The point-of-sale device 62 can also store a record of the transaction and can interact with the virtual servers 64 to make a record of the particulars of the transaction including the confirmation of the verification of user identity. The virtual servers 64 may discard the first encrypted user biometric data with the second encryption key (K2).

Figure 4:
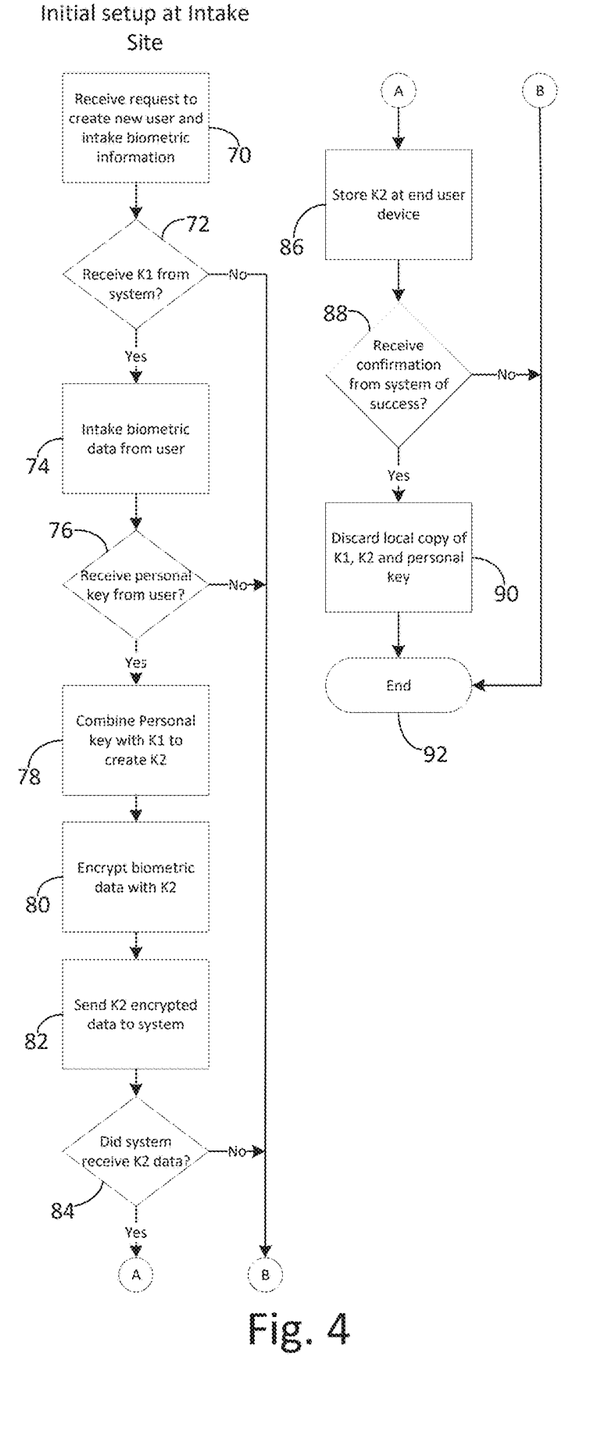
FIG. 4 is a flowchart of one embodiment of a process for a user to intake biometric data into a biometric data device.

FIG. 4 is a flowchart of one embodiment of a process for a user to intake biometric data into a biometric data device, such as biometric intake device 34 in FIG. 2. The process in FIG. 4 is similar to that shown in the dataflow of FIG. 3A. The device receives a request to create a new user and intake biometric information to the system (30 in FIG. 2), as shown at step 70, and then a determination is made as to whether the first encryption key (K1) has been received from the biometric data management system (virtual servers 32 in FIG. 2), as shown at decision 72. If the first encryption key (K1) has not been received at decision 72, then the process forwards to end, at termination 92. Otherwise, if the first encryption key (K1) has been received at decision 72, then the device intakes the biometric data from the user (end user 36 in FIG. 2), as shown at step 74, and then a determination is made as to whether a personal user key has been received from the user, as shown at decision 76.

If the personal user key has not been received at decision 76, then the process forwards to end, at termination 92. Otherwise, the device then combines the personal user key with the first encryption key (K1) to create a second encryption key (K2), as shown at step 78, and the user biometric data is encrypted with the second encryption key (K2) as shown at step 80. Then the first encrypted data is sent to the biometric data management system (virtual servers 32 in FIG. 2), as shown at step 82, and then a determination is made as to whether the biometric data management system received the first encrypted user biometric data set, as shown at decision 84. If the system did not receive the first encrypted biometric data set at decision 84, then the process forwards to end at termination 92. Otherwise, if the first encrypted user biometric data set has been received at the biometric data management system at decision 84, then the second encryption key (K2) is stored at the user device (46 in FIG. 2), as shown at step 86.

Then a determination is made as to whether a confirmation has been received from the biometric data management system as to whether the first encrypted user biometric data was successfully stored by the system, as shown at decision 88. If confirmation is not received at decision 88, then the process forwards to end at termination 92. Otherwise, if the confirmation is received at decision 88, then the first encrypted key (K1), the user personal key, and the second encryption key (K2) are discarded (e.g., deleted) from the biometric data intake device (34 in FIG. 2), as shown at step 90, and then the process ends at termination 92.

Figure 5:
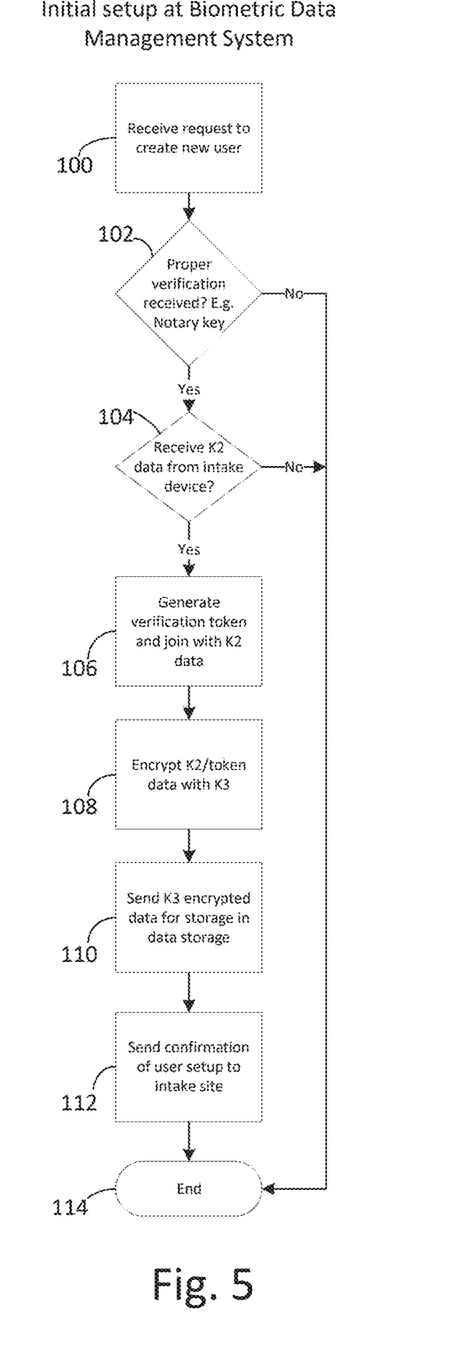
FIG. 5 is a flowchart of one embodiment of a process for initial setup and intake of encrypted biometric data from a user.at the biometric data management system, including the use of an embedded verification token in the doubly encrypted biometric data.

FIG. 5 is a flowchart of one embodiment of a process for initial setup and intake of encrypted biometric data from a user.at the biometric data management system, such as virtual servers 32 in FIG. 2, including the use of an embedded verification token in the doubly encrypted biometric data. The process in FIG. 5 is similar to that shown in the dataflow of FIG. 3A. The process begins with the virtual servers 32 receiving a request to create a new user from the biometric data intake device (50 in FIG. 3A), as shown at step 100. Then a determination is made as to whether a proper verification of the biometric data intake device (50 in FIG. 3A) is received, as shown at decision 102. The proper verification of the device can be a key, such as a notary key, or other security verification that the device can properly intake user biometric data and upload it to the biometric data management system (virtual servers 52 in FIG. 3A) for the session.

If verification does not occur at decision 102, then the process forwards to end at termination 114. Otherwise, if verification does occur at decision 102, then a determination is made as to whether the first encrypted user biometric data (K2 encrypted data or K2 data) has been received from the biometric data intake device (50 in FIG. 3A) as shown by decision 104. If the first encrypted user biometric data has not been received at decision 104, then the process forwards to end at termination 114. Otherwise, if the first encrypted user biometric data is received at decision 104, then the biometric data management system (virtual servers 52 in FIG. 3A) generates (i.e., creates) one or more verification tokens (T) and joins (i.e., embeds) it (them) to the first encrypted user biometric data, as shown at step 106. Then the first encrypted user biometric data and the verification token (T) are encrypted with a third encryption key (K3), as shown at step 108, to create a second encrypted user biometric data.

Then the second encrypted user biometric data (K3 encrypted data) is sent to a data storage, such as Hyperledger fabric 54 in FIG. 3A, for storage in one or more blocks, as shown at step 110. The storage can be private or open depending on preference. Then the biometric data management system sends confirmation to the biometric data intake device of user setup and storage of the second encrypted biometric data storage, as shown at step 112, and then the process ends at termination 114.

Figure 6:
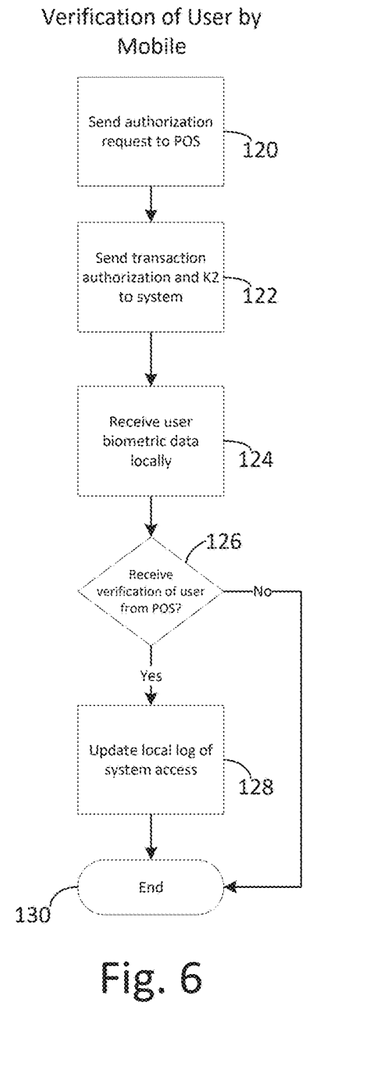
FIG. 6 is a flowchart of one embodiment of a process for a user to request unencryption of stored encrypted biometric data at a point-of-sale.

FIG. 6 is a flowchart of one embodiment of a process for a user (end user 44 in FIG. 2) to request decryption of stored encrypted biometric data at a point-of-sale (48 in FIG. 2). The process in FIG. 6 is similar to that shown in the dataflow of FIG. 3B. The process start when the user (end user 44), through their user mobile device (46 in FIG. 2) in this embodiment, sends an authorization for use of the biometric data in identity verification to the point-of-sale (62 in FIG. 3B), as shown at step 120, and then sends a transaction authorization and the second encryption key (K2) to the biometric data management system (virtual servers 64 in FIG. 3B), as shown at step 122. Then the user mobile device 60 intakes the end user 44 biometric data locally for use in the comparison to prove identity, as shown at step 124. Then a determination is made as to whether the verification for the user identity has been approved at the point-of-sale device 62, as shown at decision 126.

If the authorization of the verification has not been received at decision 126, then the process forwards to end at termination 130. If the authorization has been received at decision 126, then the local log of biometric data management system (virtual servers 64) is updated and the process ends at termination 130. Step 128 is merely an embodiment and is not required to perform the process described herein.

Figure 7:
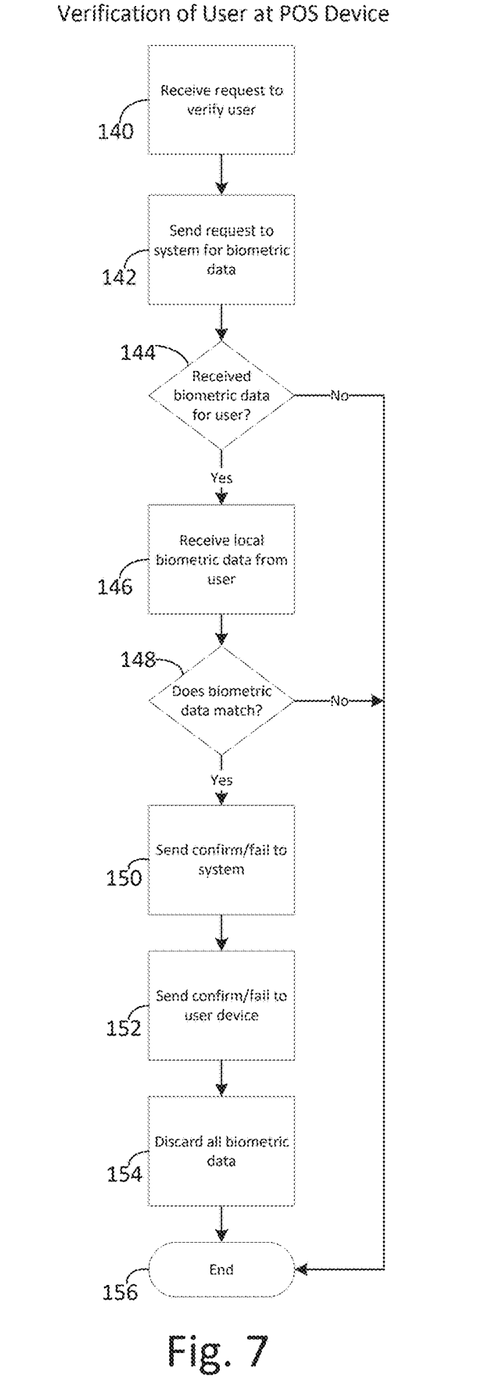
FIG. 7 is a flowchart of one embodiment of a process for verification of user identity from a biometric data reference sent from the biometric data management system.

FIG. 7 is a flowchart of one embodiment of a process for verification of user identity from a biometric data reference set sent from the biometric data management system (such as virtual server 32 in FIG. 2) at a point-of-sale (such as point-of-sale 48 in FIG. 2). The process in FIG. 7 is similar to that shown in the dataflow of FIG. 3B. The process starts with receipt of a request from a user mobile device (60 in FIG. 3B) to use the system for user identity verification with biometric data, as shown at step 140. Then the point-of-sale device 62 sends a request for a reference biometric data set for that user to the biometric data management system (virtual servers 64 in FIG. 3B), as shown at step 142.

A determination is then made as to whether the reference biometric data set has been received for the user, as shown at decision 144. If the reference biometric data set has not been received at decision 144, then the process forwards to end at termination 156. Otherwise, if the reference biometric data set has been received at decision 144, then the local biometric data is received from the user (end user 44 in FIG. 2) at the user mobile device (46 in FIG. 2; mobile device 60 in FIG. 3B), as shown at step 146. The user biometric data can be obtained from the point-of-sale device 62 if it is embodied with the requisite equipment to do so. One of skill in the art can reconfigure the devices and dataflow accordingly to have different steps of the processes described herein performed at different devices and locations on the system.

After step 146, a determination is then made as to whether the biometric data sets match, thus confirming or disproving user identity, as shown at decision 148. If the biometric data does not match at decision 148, then the process forwards to end at termination 156. Otherwise, if a match is confirmed at decision 148, then a confirm or fail is sent to the biometric data management system (virtual servers 64), as shown at step 150, and a confirm or fail is also sent to the user device 60, as shown at step 152. Then all biometric data is discarded from the point-of-sale device 62, as shown at step 154 and the process ends at termination 156.

Figure 8:
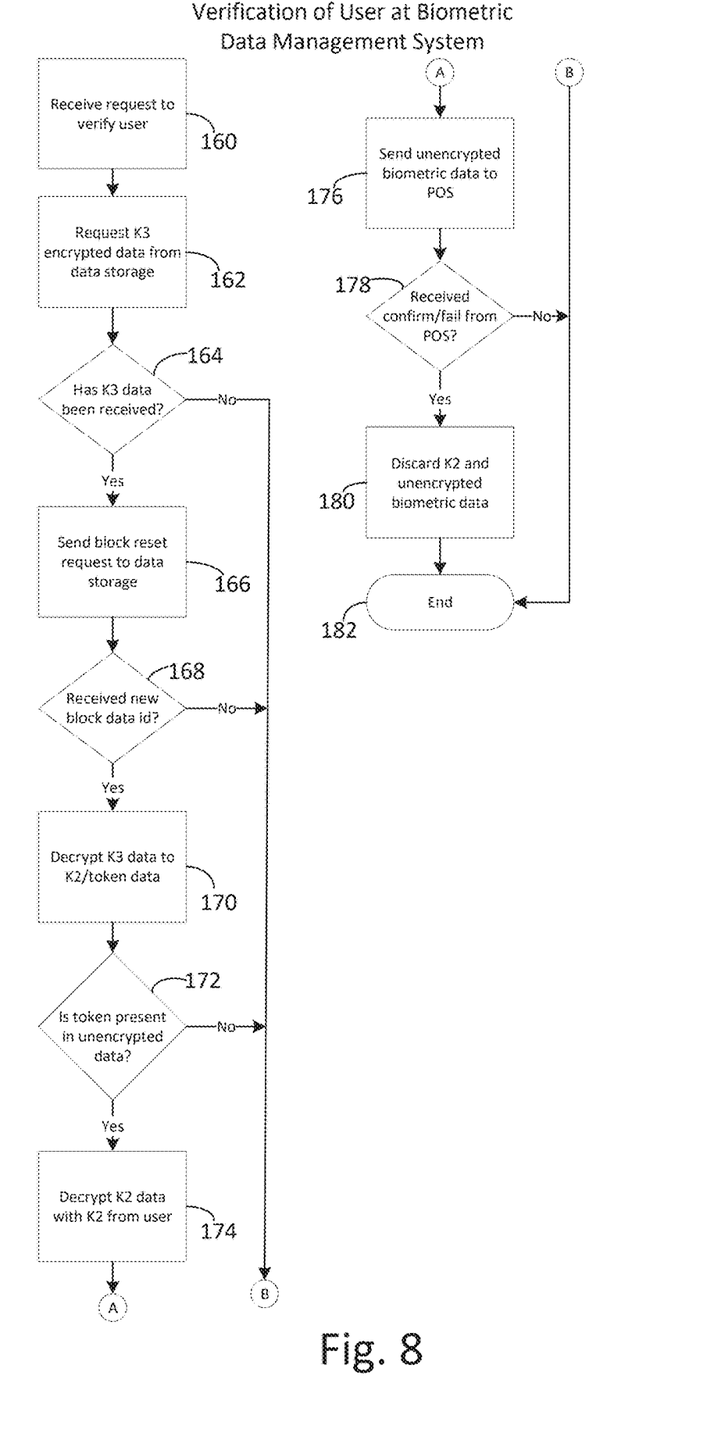
FIG. 8 is a flowchart of one embodiment of a process for full unencryption of stored biometric user data with use of a verification token for data integrity.

FIG. 8 is a flowchart of one embodiment of a process for full decryption of stored biometric user data with use of a verification token for data integrity at the biometric data management system (such as the virtual servers 32 in FIG. 2, or virtual servers 64 in FIG. 3b). The process in FIG. 8 is similar to that shown in the dataflow of FIG. 3B. The process begins with the biometric data management system (virtual servers 64) receiving a request from a user, either from the user device 60, the point-of-sale device 62 or both, as shown at step 160. Then the biometric data management system requests the user's second encrypted user biometric data (K3 encrypted data, also referred to as K3 data) from the data storage, such as Hyperledger fabric 64 in FIG. 3B, as shown at step 162. In this embodiment, this request includes the stored encrypted user biometric data from the one or more blocks where the data is stored. A determination is then made on whether the second encrypted user biometric data has been received, as shown at decision 164.

If the second encrypted user biometric data has not been received at decision 164, then the process forwards to end at termination 182. Otherwise, if the user's second encrypted user biometric data has been received at decision 164, then a storage block reset request is sent to the data storage (Hyperledger fabric 66 in FIG. 3B) such that the stored data is moved, as shown at step 166. This step allows the storage of the second encrypted user biometric data to be on a public blockchain or other publicly-accessible storage media. After step 166, a determination is made as to whether confirmation is received from the data storage (Hyperledger fabric 66) that the data block(s) have been successfully moved and the new location of the block(s), as shown at decision 168. If the confirmation and new location has not been received at decision 168, then the process forward to end at termination 182. Otherwise, if the confirmation and new location has been received at decision 168, then the biometric data management system (virtual servers 64) decrypts the second encrypted user biometric data to be the first unencrypted user biometric data (K2 encrypted data) and the verification token (T), as shown at step 170.

A determination is then made on whether the intact verification token (T) is present in the unencrypted data, as shown in decision 172. If multiple verification tokens are present in multiple blocks of unencrypted data, then decision 172 can be the iteration through all data integrity checks in the newly decrypted data. If the verification token is not intact at decision 172, then the process forwards to end at termination 182. Otherwise, if the verification token(s) is intact at decision 172, then the second encrypted user biometric data is decrypted with the sent key (K2) from the user to become unencrypted original user biometric data (K2 data), as shown at step 174, and then the original data is sent to the point-of-sale device 62 for comparison of the new user biometric data and verification of the user identity, as shown at step 176. In this case, the point-of-sale device 62 may be referred to as a third-party biometric comparison device. Thus, the biometric data management system may be configured to transmit the original user biometric data to the third-party biometric comparison device across the network.

In another embodiment, the biometric data management system itself can obtain the new user biometric data for comparison, such as at virtual servers 32, and send the results to other devices across the network. For example, the biometric data management system may retrieve new user biometric data from the point-of-sale device (e.g., point-of-sale device 62) across the network. The biometric data management system may compare the new biometric user data against the unencrypted original user biometric data to determine a matching status. The biometric data management system may then transmit the matching status to the point-of-sale device across the network.

After step 176, a determination is then made as to whether the user identity was confirmed or failed at the point-of-sale device 62, as shown at decision 178. If the confirm/fail has not been received at decision 178, then the process forwards to end at termination 182. Otherwise, if the confirm/fail is received at decision 178, then the biometric data management system (virtual servers 64) discards the second encryption key (K2) and all original user biometric data is deleted from the system, as shown at step 180, and the process ends at termination 182.

It should be appreciated that one of skill in the art would be able to have different parts of the processes descried herein performed by different devices at different locations, either locally or remotely located. For example, the biometric data can be collected at the user device 46, biometric data intake device 34, or point-of-sale 48. Furthermore, the use of keys can be done singularly or in multiple with keys apportioned to data blocks for either encryption or data integrity verification as is known in the art.

What is claimed is:

1. A system for storage and retrieval of encrypted biometric data, comprising:
   a biometric data intake device configured to selectively intake original biometric data from a user, the biometric data intake device selectively communicably connected to a network and sending and receiving data thereacross;
   a biometric data management system connected to the network and in selective communication with the biometric data intake device, the biometric data management system in further communication with at least one data storage for the selective storage and retrieval of encrypted biometric data;
   wherein the biometric data management system is selectively configured to transmit a first encryption key to the biometric data intake device for original user biometric data intake;
   wherein the biometric data intake device receiving the first encryption key from the biometric data management system and further configured to:
   receive a user key from a user;
   create a second encryption key from the first encryption key and the user key;
   intake an original user biometric data from the user;
   encrypt the original user biometric data with the second encryption key to create a first encrypted user biometric data;
   transmit the first encrypted user biometric data to the biometric data management system;
   store the second encryption key at a device of the user;
   delete the second encryption key from the biometric data intake device;
   wherein the biometric data management system is further configured to:
   generate a third encryption key;
   further encrypt the first encrypted user biometric data with the third encryption key to create a second encrypted user biometric data;
   store the second encrypted user biometric data at a data storage;
   create a verification token;
   embed the verification token with the first encrypted user biometric data prior to encrypting the encrypted user biometric data with the third encryption key to become second encrypted user biometric data; and
   store the second encrypted user biometric data with the verification token embedded therein.

2. The system of claim 1, wherein the biometric data management system further configured to:
   receive a user request for the user biometric data, the request including the second encryption key;
   retrieve the second encrypted user biometric data from the data storage;
   decrypt the second encrypted user biometrics data with the third key such that the data becomes first unencrypted user biometric data and the verification token;
   verify the integrity of the verification token; and
   decrypt the first encrypted user biometric data with the second encryption key to become original user biometric data.

3. The system of claim 2, wherein the biometric data management system further configured to transmit the original user biometric data to a third-party biometric comparison device across the network.

4. The system of claim 2, wherein the biometric data management system further configured to:
   retrieve new user biometric data from a point-of-sale device across the network;
   compare the new biometric user data against the unencrypted original user biometric data to determine a matching status; and transmit the matching status to the point-of-sale device across the network.

5. The system of claim 1, wherein the biometric data management system further configured to store the second encrypted user biometric data at a data storage across the network.

6. The system of claim 1, wherein the biometric data management system further configured to store the second encrypted user biometric data in Hyperledger fabric.

7. The system of claim 6, wherein the biometric data management system further configured to store the second encrypted user biometric data in a public blockchain.

8. A method of storing and retrieving encrypted biometric data, comprising the steps of:
  communicating an original biometric data intake request from a biometric data intake device to a biometrics data management system, the biometric intake device selectively communicably connected to a network and sending and receiving data thereacross;
  transmitting a first encryption key from the biometric data management system to the biometric data intake device, the biometric data management system connected to the network and in selective communication with the biometric intake device;
  the biometric data intake device further:
    receiving the first encryption key from the biometric data management system;
    receiving a user key from a user;
    creating a second encryption key from the first encryption key and user key;
    intaking at the biometric intake device original user biometric data from the user;
    encrypting the original user biometric data with the second encryption key to create a first encrypted user biometric data;
    transmitting the first encrypted user biometric data to the biometric data management system;
    storing the second encryption key at a device of the user; and
    deleting the second encryption key from the biometric data intake device;
  the biometric data management system further:
  generating a third encryption key;
  encrypting the first encrypted user biometric data with the third encryption key to create a second encrypted user biometric data; and
  storing the second encrypted user biometric data at a data storage;
  creating a verification token;
  embedding the verification token with the first encrypted user biometric data prior to encrypting the encrypted user biometric data with the third encryption key to become second encrypted user biometric data; and
  storing the second encrypted user biometric data with the verification token embedded therein.

9. The method of claim 8, wherein, at the biometric data management system, further:
  receiving a user request for the user biometric data, the request including the second encryption key;
  retrieving the second encrypted user biometric data from the data storage;
  decrypting the second encrypted user biometrics data with the third key such that the data becomes first unencrypted user biometric data and the verification token;
  verifying the integrity of the verification token; and
  decrypting the first encrypted user biometric data with the second encryption key to become original user biometric data.

10. The method of claim 9, wherein, at the biometric data management system, further transmitting the original biometric data to a third-party biometric comparison device across the network.

11. The method of claim 9, wherein, at the biometric data management system, further:
  retrieving new user biometric data from a point-of-sale device across the network;
  comparing the new biometric user data against the unencrypted original user biometric data to determine a matching status; and
  transmitting the matching status to the point-of-sale device across the network.

12. The method of claim 8, wherein, at the biometric data management system, further storing the second encrypted user biometric data at a data storage across the network.

13. The method of claim 8, wherein, at the biometric data management system, further storing the second encrypted user biometric data in Hyperledger fabric.

14. The method of claim 13, wherein, at the biometric data system, further storing the second encrypted user biometric data in a public blockchain.

15. A system for storage and retrieval of encrypted biometric data, comprising:
  a biometric data intake means for selectively intaking original biometric data from a user, the biometric intake means selectively communicably connected to a network and sending and receiving data thereacross;
  a biometric data management means for managing the storage and retrieval of encrypted biometric data, the biometric data means connected to a network and in selective communication with the biometric data intake means, the biometric data management means in further communication with at least one data storage means for the selective storage and retrieval of encrypted biometric data, wherein the biometric data management means further for transmitting a first encryption key to the biometric data intake means for original user biometric data intake;
  wherein the biometric data intake means further for:
    receiving the first encryption key from the biometric data management means receiving a user key from a user;
    creating a second encryption key from the first encryption key and user key;
    intaking original user biometric data from the user;
    encrypting the original user biometric data with the second encryption key to create a first encrypted user biometric data;
    transmitting the first encrypted user biometric data to the biometric data management means;
    storing the second encryption key at a device of the user;
    deleting the second encryption key from the biometric data intake device;
  wherein the biometric data management means further for:
    generating a third encryption key;
    encrypting the first encrypted user biometric data with the third encryption key to create a second encrypted user biometric data;
    storing the second encrypted user biometric data at a data storage means for storing data;
    creating a verification token;

embedding the verification token with the first encrypted user biometric data prior to encrypting the encrypted user biometric data with the third encryption key to become second encrypted user biometric data; and storing the second encrypted user biometric data with the verification token embedded therein.

16. The system of claim 15, wherein the biometric data management means further for:

receiving a user request for the user biometric data, the request including the second encryption key;

retrieving the second encrypted user biometric data from the data storage means;

decrypting the second encrypted user biometrics data with the third key such that the data becomes first unencrypted user biometric data and the verification token;

verifying the integrity of the verification token;

decrypting the first encrypted user biometric data with the second encryption key to become original user biometric data.

17. The system of claim 16, wherein the biometric data management means further for transmitting the original user biometric data to a third-party biometric comparison means for comparing new user biometric data with original user biometric data.

* * * * *